(12) United States Patent
Kim

(10) Patent No.: US 10,706,785 B2
(45) Date of Patent: Jul. 7, 2020

(54) ROLLABLE DISPLAY AND DRIVING METHOD THEREOF

(71) Applicant: LG DISPLAY CO., LTD., Seoul (KR)

(72) Inventor: Kyung-Rok Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/134,662

(22) Filed: Sep. 18, 2018

(65) Prior Publication Data
US 2019/0197960 A1 Jun. 27, 2019

(30) Foreign Application Priority Data
Dec. 27, 2017 (KR) .................. 10-2017-0181309

(51) Int. Cl.
| | |
|---|---|
| G09G 3/3266 | (2016.01) |
| G09G 3/3275 | (2016.01) |
| G05D 3/10 | (2006.01) |
| G09G 5/38 | (2006.01) |
| G09G 3/3225 | (2016.01) |
| G09G 5/34 | (2006.01) |

(52) U.S. Cl.
CPC ............. *G09G 3/3266* (2013.01); *G05D 3/10* (2013.01); *G09G 3/3275* (2013.01); *G09G 5/38* (2013.01); *G09G 3/3225* (2013.01); *G09G 5/34* (2013.01); *G09G 2310/04* (2013.01); *G09G 2310/08* (2013.01); *G09G 2320/0257* (2013.01); *G09G 2320/046* (2013.01); *G09G 2330/026* (2013.01); *G09G 2340/0442* (2013.01); *G09G 2340/0471* (2013.01); *G09G 2380/02* (2013.01)

(58) Field of Classification Search
CPC .. G09G 3/3266; G09G 3/3275; G09G 3/3225; G09G 5/38; G09G 5/34; G09G 10/04; G09G 10/08; G09G 2320/0257; G09G 2320/046; G09G 2330/026; G09G 2340/0442; G09G 2340/0471; G09G 2380/02; G05D 3/10
See application file for complete search history.

(56) References Cited

U.S. PATENT DOCUMENTS

| | | | |
|---|---|---|---|
| 2006/0125391 A1* | 6/2006 | Aksamit | G06F 1/1601 313/511 |
| 2008/0049003 A1* | 2/2008 | Hasegawa | G06F 1/1615 345/206 |
| 2015/0243203 A1* | 8/2015 | Kim | G09G 3/3233 345/212 |

(Continued)

FOREIGN PATENT DOCUMENTS

| | | |
|---|---|---|
| GB | 2554142 A | 3/2018 |
| KR | 10-2016-0034459 A | 3/2016 |
| KR | 10-2017-0083404 A | 7/2017 |

*Primary Examiner* — Mark Edwards
(74) *Attorney, Agent, or Firm* — Birch, Stewart, Kolasch & Birch, LLP

(57) ABSTRACT

A rollable display including a flexible display panel having a screen that is separated into an exposed display region and a non-exposed display region. The screen of the flexible display panel is moved using a screen driver, and a moving direction of the exposed display region is controlled to be opposite to a moving direction of the screen, to distribute the stress of pixels, without changing an absolute location of the exposed display region, and to defer degradation of the pixels.

20 Claims, 15 Drawing Sheets

(56) References Cited

U.S. PATENT DOCUMENTS

| | | | |
|---|---|---|---|
| 2016/0112667 A1* | 4/2016 | Park | G06F 1/1601 |
| | | | 348/739 |
| 2016/0202781 A1* | 7/2016 | Kim | G06F 1/1652 |
| | | | 345/173 |
| 2016/0307545 A1* | 10/2016 | Lee | G09G 5/38 |
| 2016/0321974 A1* | 11/2016 | Chun | G09G 3/007 |
| 2017/0147189 A1 | 5/2017 | Ryu et al. | |

* cited by examiner

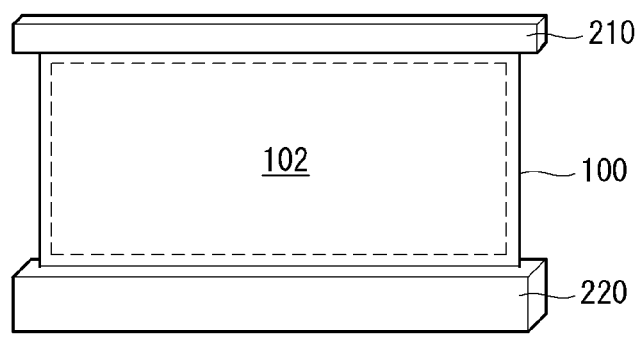
FIG. 1
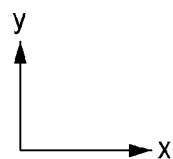
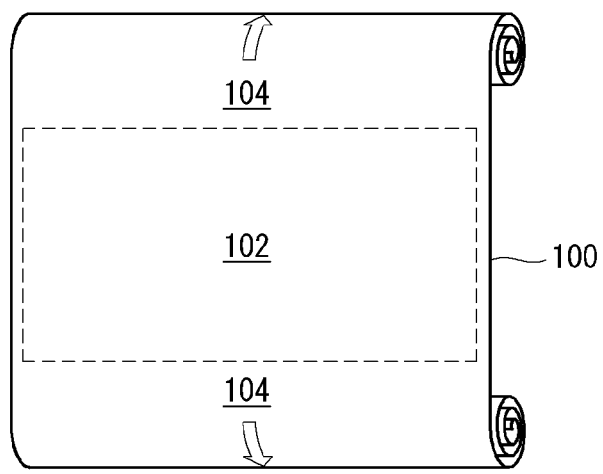
FIG. 2

FIG. 8

| PRIORITY | EVENT | CONTROL RIGHT |
|---|---|---|
| 1 | Power On/Off | SET |
| 2 | Motor User Control | SET |
| 3 | Partial Mode Selection | SET |
| 4 | SET Requset | SET |
| 5 | TCON Booting (ON-sequence) | SET |
| 6 | Normal Driving | TCON |

ROLLABLE DISPLAY AND DRIVING METHOD THEREOF

CROSS REFERENCE TO RELATED APPLICATIONS

This application claims the benefit of Korean Patent Application No. 10-2017-0181309 filed on Dec. 27, 2017, the entire contents of which is incorporated herein by reference for all purposes as if fully set forth herein.

BACKGROUND OF THE INVENTION

Field of the Invention

The present disclosure relates to a rollable display manufactured having an organic light emitting display that is capable of preventing an afterimage, and a driving method of the rollable display.

Discussion of the Related Art

A light emitting display electroluminescent display is classified as an inorganic electroluminescent display or an organic electroluminescent display, such as an organic light emitting display, depending on a material of an emission layer. An active matrix-type organic light emitting display includes an Organic Light Emitting Diode (OLED) emitting light by itself, has a fast response speed and a wide viewing angle and produces brightness with high luminous efficiency. The organic light emitting display is configured such that the OLED is formed in each pixel. In addition to the fast response speed, the excellent luminous efficiency and brightness, and the wide viewing angle, the organic light emitting display has a good contrast ratio and is excellent in reproducing color since the organic light emitting display is able to represent a black gray scale by a complete black color.

The organic light emitting display does not have liquid crystals and a backlight unit. The organic light emitting display may implement pixels on a flexible plastic substrate, a thin glass substrate, or a metal substrate. Thus, the organic light emitting display is most suitable for a flexible display.

The flexible display may roll, fold, or bend a display panel, to change the size of an area in which an image is displayed. The flexible display may be implemented as a rollable display, a bendable display, a foldable display, a slidable display, etc. Such a flexible display may be applicable not just to a mobile device, such as a smart phone and a tablet PC, but also a TV, a vehicle display, a wearable device, etc., and the range of technical fields of the flexible display is increasingly expanding.

When the organic light emitting display device is driven for a long time in a state where the screen is fixed like a static image, a burn-in phenomenon may occur in pixels. The burn-in phenomenon refers to a phenomenon in which the pixels are degraded as stresses of the pixels are accumulated when an image displayed on the screen is fixed for a long time. Such degradation of the pixels may cause an after image indicating that a previous image remains even after the screen is changed. In order to solve an afterimage problem, an orbit algorithm may be applied. The orbit algorithm is a method of rotating the screen in a constant direction every predetermined time unit, for example, every minute, to distribute the stress of the pixels.

SUMMARY OF THE INVENTION

An orbit algorithm moves a fixed screen upward, downward, leftward, and rightward in a constant direction, and thus, it is possible to find that a user is rotating the screen if a fixed pattern, such as a letter, is observed. In addition, it is found that a bezel, which is a non-display region, expands as much as a moved distance of the screen. In addition, when an image is expanded in order to implement the orbit algorithm, a data rate between a host system and a timing controller increases. In order to improve the orbit effects, the entire screen needs to move, but only some pixels are able to move due to a memory restriction and visual direction.

Thus, the present disclosure provides a rollable display capable of preventing an afterimage by distributing stress without causing a screen to be moved from a user's point of view, and a driving method of the rollable display.

A rollable display of the present disclosure includes: a data driver configured to supply a data signal of an input image to a flexible display panel; a timing controller configured to transmit data of the input image to the data driver and control an operation timing of the data driver; and a screen driver configured to move a screen of the flexible display panel. The screen of the flexible display panel may be separated into an exposed display region and a non-exposed display region. The input image may be displayed on the exposed display region. The exposed display region may be moved in a direction opposite to a moving direction of the screen.

A driving method of the rollable display includes: separating a screen of a flexible display panel into an exposed display region and a non-exposed display region; displaying an input image on the exposed display region; moving the screen of the flexible display panel using the screen driver; and controlling a moving direction of the exposed display region to be opposite to a moving direction of the screen.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a diagram schematically illustrating a rollable display according to an embodiment of the present disclosure;

FIG. 2 is a diagram illustrating a flexible display panel being separated from the rollable display shown in FIG. 1;

FIG. 8 is a diagram illustrating the control right of a motor according to an event of a rollable display;

DETAILED DESCRIPTION OF THE EMBODIMENTS

Figure 3A:
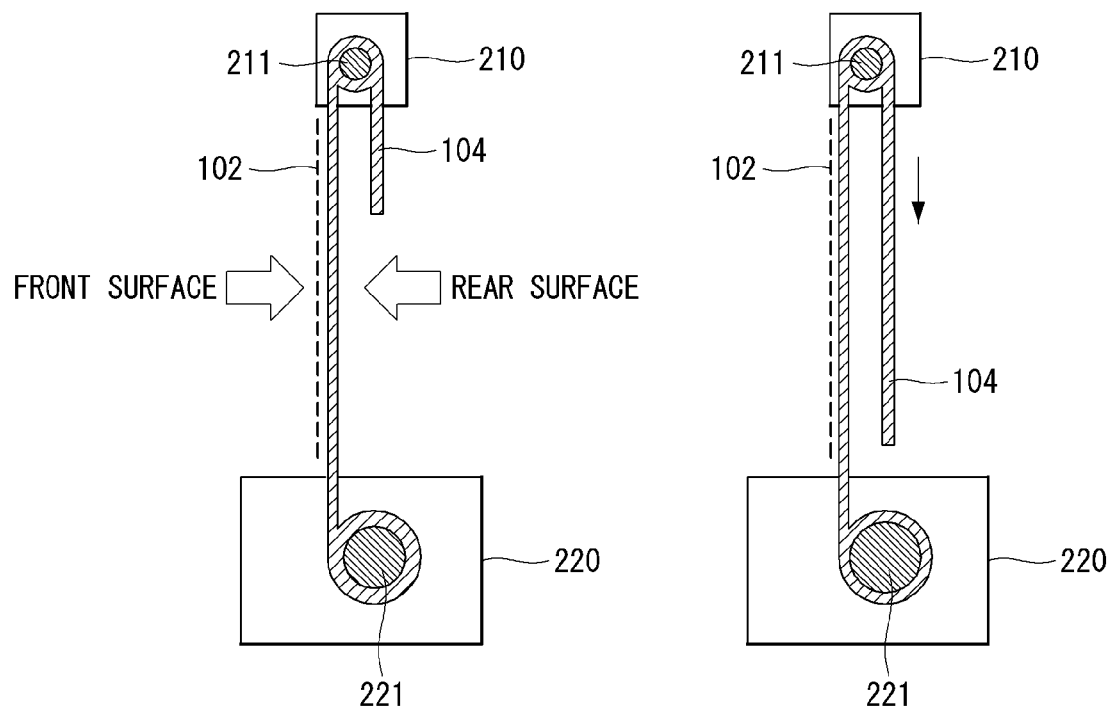
FIGS. 3A and 3B are diagrams illustrating an example in which a non-exposed display region of a rollable display is rolled over a rear surface.

Advantages and features of the present disclosure and methods for achieving the advantages and features may become apparent from the embodiments to be hereinafter described in conjunction with the drawings. However, the present disclosure is not limited to the embodiments and may be embodied in various modifications. The embodiments are provided merely to fully disclose the present disclosure and advise those skilled in the art of the category of the disclosure. The present disclosure is defined only by the appending claims. The same reference numbers denote the same elements throughout the specification.

The shapes, sizes, ratios, angles, numbers and the like disclosed in the drawings are exemplary and the embodiment is not limited thereto. Like reference numerals refer to like elements throughout the specification. In the following description of the embodiment, a detailed description of known related arts will be omitted when it is determined that the gist of the embodiment may be unnecessarily obscured In the case where the terms "includes," "having," "done," etc., are used in this specification, other parts may be added unless "only" is used. As used herein, the singular forms "a," "an" and "the" are intended to include the plural forms as well, unless the context clearly indicates otherwise.

In interpreting the constituent elements, it is construed to include the error range even if there is no separate description.

In the case of a description of the positional relationship, for example, if the positional relationship between two parts is described as "on," "above," "under," or "next to" is not used, one or more other portions may be located between the two portions unless "immediately" or "directly" is used.

The first, second, and the like are used to describe various components, but these components are not limited by these terms. These terms are only used to distinguish one component from another. Therefore, the first component mentioned below may be the second component within the technical spirit of the embodiment.

It is to be understood that the features of various embodiments may be partially or entirely coupled or combined with each other and technically various interlocking and driving are possible, and that the embodiments may be practiced independently of each other.

Hereinafter, various embodiments of the present disclosure will be described with reference to the accompanying drawings.

Referring to FIGS. 1 and 2, a rollable display according to an embodiment of the present disclosure includes a flexible display panel 100, a first box 210 in which the upper end of the flexible display panel 100 is rolled up, and a second box 220 in which the bottom end of the flexible display panel 100 is rolled.

A screen of the flexible display panel 100 includes a pixel array. The screen includes an exposed display region 102 exposed to a user, and a non-exposed display region 104 rolled up by the first and second boxes 210 and 220. The user is able to see an image displayed on the exposed display region 102, but not able to see the non-exposed display region 104. The exposed display region 102 is part of the screen of the display panel 100.

The present disclosure moves the display panel 100 upward, downward, leftward, and rightward using a screen driver of the first and second boxes 210 and 220 so as to distribute stress of pixels 101. The screen driver may include at least one of motor. Although the screen of the display panel 100 moves, the absolute location of the exposed display region 102 from the user's point of view is not changed because the pixel locations, into which pixel data is written, are move in a direction opposite to a moving direction of the display panel 100. Thus, the user does not recognize the change of the position of the exposed display region 102.

One of the first and second boxes 210 and 220 may be a set box in which a motor, power, a system board, a display panel driver, etc., are arranged. The following description focuses on the example in which the second box 220 is a set box, but aspects of the present disclosure are not limited thereto.

During a normal driving period, a distance between the first box 210 and the second box 220 is fixed constantly. Thus, during the normal driving period, the size and positions of the exposed display region 102 between the first box 210 and the second box 220 are fixed.

Figure 14A:
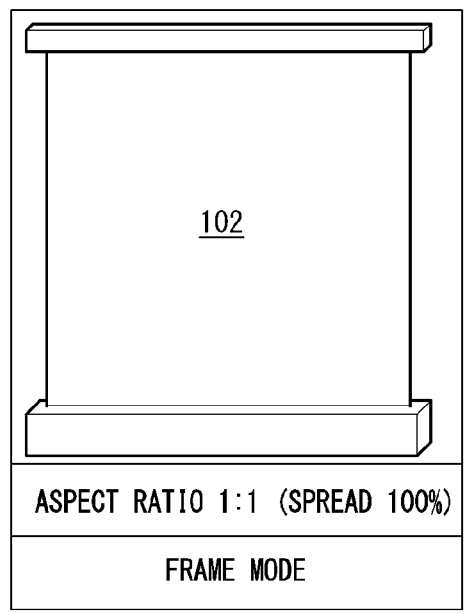
FIGS. 14A to 14D are diagrams illustrating diverse aspect ratios set in a partial mode.
Figure 14B:
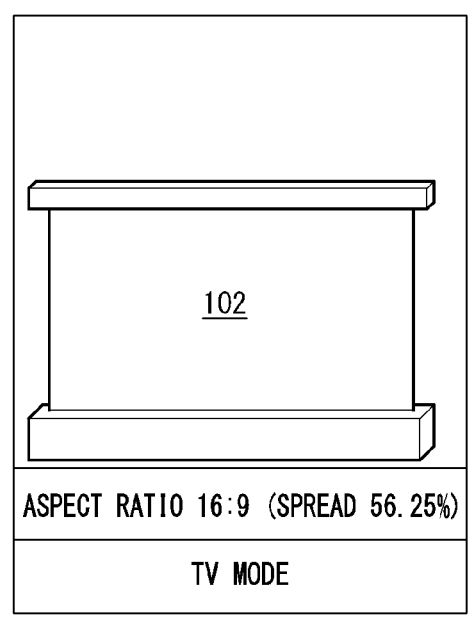
Figure 14C:
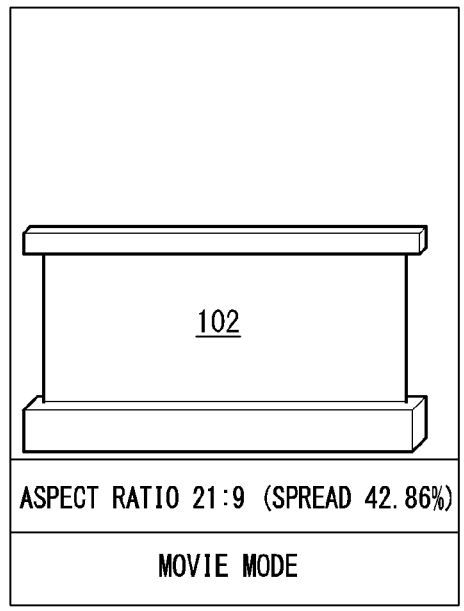

The rollable display according to the present disclosure may provide diverse aspect ratios in a partial mode, as shown in FIGS. 14A to 14C. In this case, a distance between the first box 210 and the second box 220 may be changed depending on an aspect ratio selected in the partial mode.

Referring to FIG. 3A, a motor and a driving roller 210 connected to the motor are arranged in the second box 220. A direction conversion roller 211 is arranged without a motor in the first box 210. If a motor is arranged even in the first box 210, a motor power source, a motor driver, etc., need to be arranged as well, and this increases the size of the first box 210.

The flexible display panel 100 is rolled between a driving roller 221 and the direction conversion roller 211. If the driving roller 221 is rotated in response to rotation of a motor, the flexible display panel 100 is moved in an upward-downward direction (Y axis) along the driving roller 221, and the direction conversion roller 221 is rotated in conjunction with the flexible display panel 110 in the same rotating direction as that of the driving roller 221. The flexible display panel may be moved by a motor in a leftward-rightward direction (X axis). When the flexible display panel 100 is moved upward, the direction conversion roller 221 rolls the upper end of the flexible display panel 100 toward the rear surface of the flexible display panel 100.

The user may see the exposed display region 102 which is exposed on a front surface of the rollable display. The non-exposed display region 104 is a portion of the flexible display panel 100 rolled into the first and second boxes 210 and 220, and a portion of the flexible display panel 100 rolled over the rear surface of the display panel 100.

The size of the exposed display region 102 and an amount of movement of the flexible display panel 100 are defined by a motor operating rate in the rollable display according to the present disclosure. The motor operating rate is proportional to an area of a screen exposed region of the exposed display region 102. For example, when the entire screen is 100% and the exposed display region occupies up to 40% of the entire screen, a motor's maximum operating range is a sum of a length of the exposed display region 40%, a length of a non-exposed display region 40% hidden behind the rear surface, and a length of a non-exposed display region rolled around the radius a of the direction conversion roller 211. Thus, when the exposed display region 102 is 40% of the entire screen, the motor varies in a range from 40% at minimum to 80%+a % at maximum.

Figure 3B:
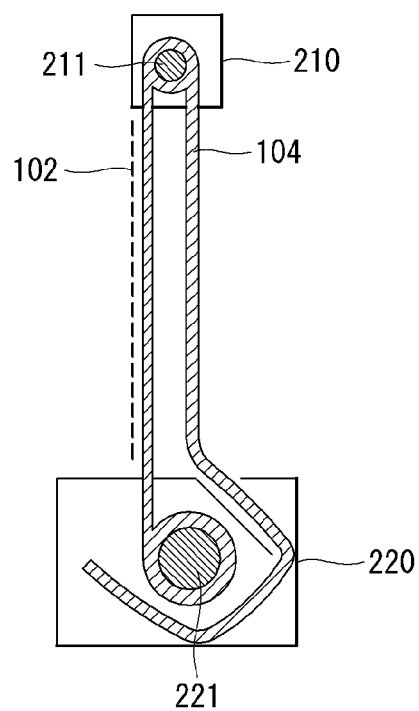

As shown in FIG. 3B, if the rollable display is manufactured such that the flexible display panel 100 is rolled into the second box 220, rather than in a manner the non-exposed display region 104 is rolled over the rear surface, there would be no restriction in the maximum motor operating range.

Figure 4:
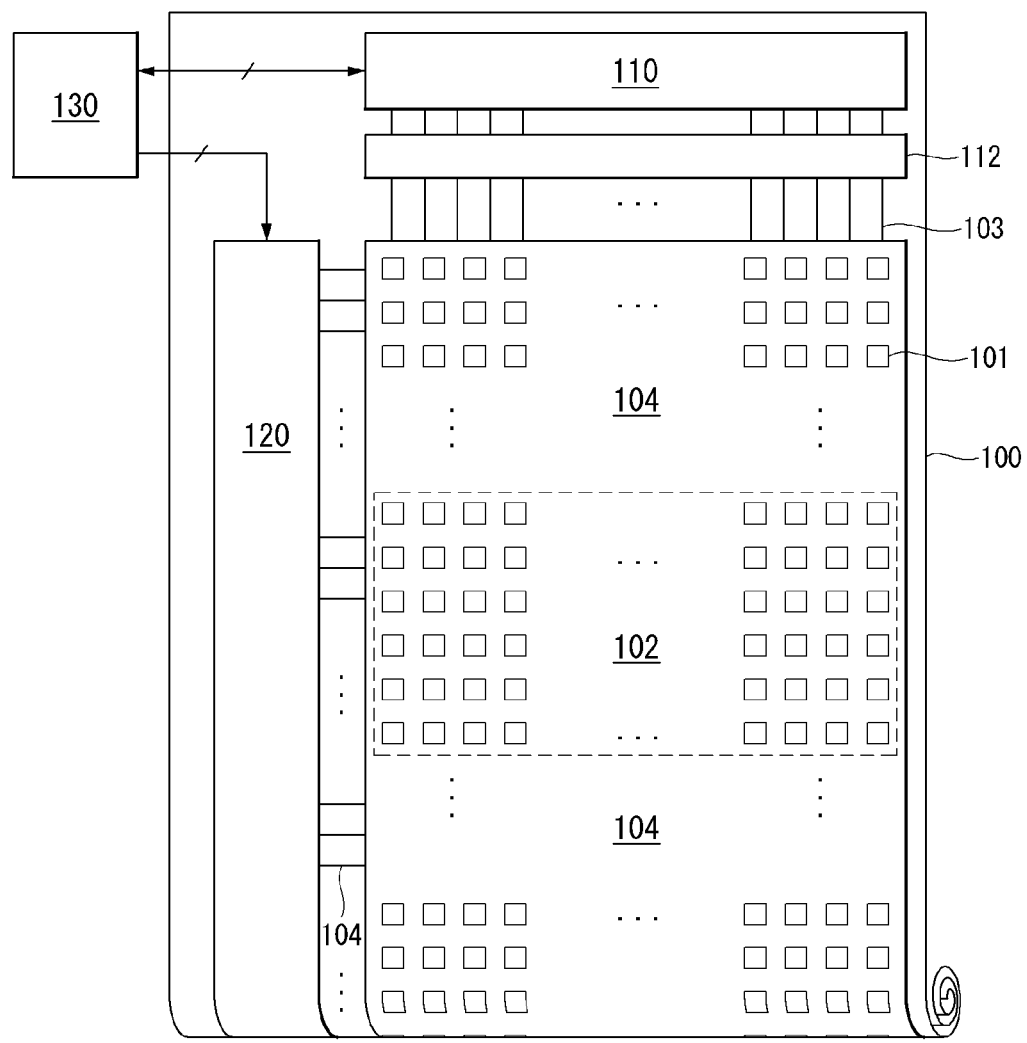
FIG. 4 is a diagram illustrating a flexible display panel and a driver thereof.
Figure 5:
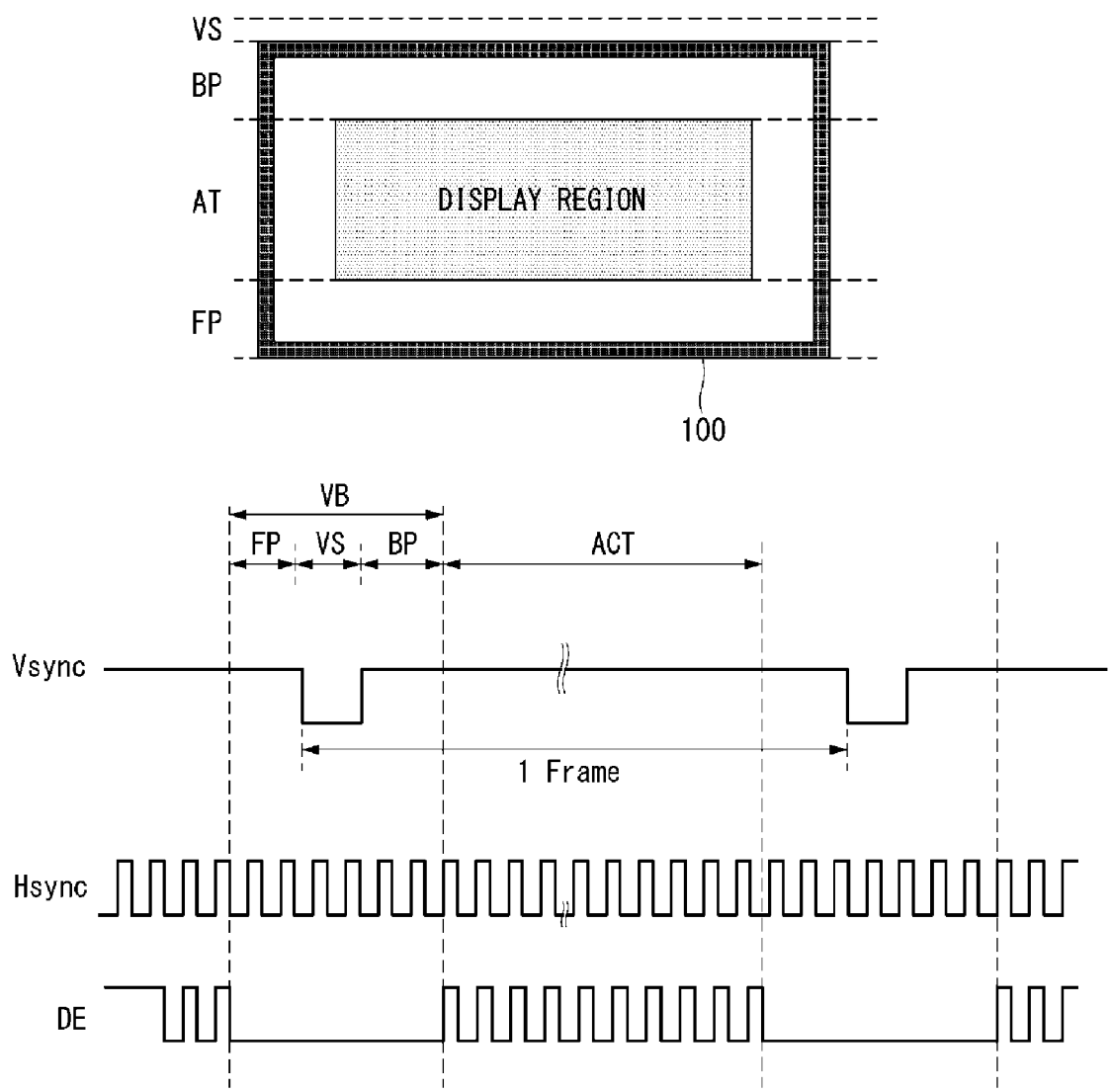
FIG. 5 is a detailed diagram illustrating an active period and a vertical blank period in one frame period.

FIG. 4 is a diagram illustrating a flexible display panel 100 and a driver thereof. FIG. 5 is a detailed diagram illustrating an active period ACT and a vertical blank period VB in one frame period.

Referring to FIG. 4, an electroluminescent display according to an embodiment of the present disclosure includes a flexible display device 100, and a display panel driving circuit.

A screen of the flexible display panel is composed of a pixel array that displays an input image. The pixel array includes a plurality of data lines 103, a plurality of gate lines 104 intersecting with the data lines 103, and pixels 101 arranged in a matrix form.

Each of the pixels 101 may be separated into a red subpixel, a green subpixel, or a blue subpixel to realize color. Each of the pixels 101 may further include a white subpixel.

Touch sensors may be disposed on the flexible display panel 100. A touch input may be sensed using additional touch sensors or may be sensed through pixels. The touch sensors may be implemented as On-cell type or an Add-on type touch sensors disposed on the screen of the display panel, or may be implemented as an In-cell type touch sensors embedded in the pixel array.

A display panel driver 110, 112, and 120 includes a data driver 110 and a gate driver 120. A de-multiplexer 112 may be interposed between the data driver 110 and the data lines 103. The display panel driver 110, 112, and 120 displays an input image on a screen by writing pixel data of the input data into pixels of the exposed display region 102 of the flexible display panel 100 under the control of a timing controller TCON 130. In a mobile device or a wearable device, the data driver 110, the timing controller 130, and a power circuit may be integrated in a Drive Integrated Circuit (DIC).

The data driver 110 converts pixel data (digital data) of an input image, received from the timing controller 130 every frame, into a gamma compensation voltage using a Digital to Analog converter (DAC) so as to output a voltage of a data signal (hereinafter, referred to as a "data voltage"). The data voltage is applied to pixels of the exposed display region 102 though the de-multiplexer 112 and the data lines 103. The de-multiplexer 112 is disposed between the data driver 110 and the data lines 103 using a plurality of switch devices, and distributes a data voltage output from the data driver 110 to the data lines 103. Since one channel of the data driver 110 is time-division connected to a plurality of data lines by the de-multiplexer 112, the number of the data lines 103 may be reduced.

The gate driver 120 may be implemented as a Gate in Panel (GIP) circuit which is formed in a bezel area on the flexible display panel 100 together with a transistor array in an active area. The gate driver 120 outputs a gate signal to the gate lines 104 under the control of the timing controller 130. By shifting a gate signal (or a scan signal) through a shift register, the gate driver 120 may supply the gate signal to the gate lines sequentially. By supplying the gate signal sequentially to the gate lines of the flexible display panel 100, the gate driver 120 scans the screen of the flexible display panel 100 one line by one line. A gate signal is synchronized with a data voltage.

In order to prevent an afterimage by distributing stress of pixels, the screen is moved by a motor of the flexible display panel 100. The screen of the flexible display panel 100 may be moved along an upward-downward direction (Y axis) and/or a leftward-downward direction (X axis). Although the screen is moved, the position of the exposed display region 102 from a user's point of view is fixed. To this end, the display panel driver 110, 112, and 120 may move the exposed display region 102 in a direction opposite a moving direction of the flexible display panel 100.

The timing controller 130 receives pixel data of an image received from a host system 200 (see FIG. 6), and a timing signal synchronized with the pixel data. The timing controller 130 transmits the pixel data of the input image to the data driver 110. A timing signal received from the host system 200 includes a vertical synchronization signal Vsync, a horizontal synchronization signal Hsync, a clock signal DCLK, a data enable signal DE, etc.

The host system 200 is mounted in a system board. The host system 200 is connected to an input unit configured to receive a user's command/data, a main power unit configured to generate main power, and a motor driver. The host system 200 controls overall functions of the rollable display, receives an image signal from a video source such as a broadcast signal receiving module, a set top box, and a memory, and transmits the image signal to the timing controller 130.

The timing controller 130 controls an operation timing of the display panel driver 110, 112, and 120 based on timing signals Vsync, Hsync, and DE received from the host system 200 mounted in the system board. To control the operation timing of the display panel driver 110, 112, and 120, the timing controller 130 generates a data timing control signal for controlling operation timings of the data driver 110, a switch control signal for controlling an operation timing of the de-multiplexer 112, and a gate timing control signal for controlling an operation timing of the gate driver 120.

The timing controller 130 detects a data enable signal period corresponding to the exposed display region 102 so as to transmit data, to be written to the pixels of the exposed display region 102, to the data driver 110. Whenever the exposed display region 102 is moved, the timing controller 130 takes over the control right of a motor. After the exposed display region 102 is moved, the timing controller 130 detects again a data enable signal period corresponding to the exposed display region 102 which has been moved.

When main power is input to the rollable display, a preset power-on sequence is executed. The power-on sequence generates power required to operate the timing controller 130, the display panel driver 110, 112, and 120, and the flexible display panel 100, and resets the timing controller 130, the display panel driver 110, 112, and 120, and the pixel array. After the power-on sequence, pixel data of an input image is displayed on the exposed display region 102 of the flexible display panel 100. When main power of the rollable display is blocked, pixel arrays are discharged in accordance with a preset power-off sequence and thus power of the timing controller 130 and accordingly the display panel driver 110, 112, and 120 is blocked.

Referring to FIG. 5, the vertical synchronization signal Vsync defines one frame period.

One frame period is a time which is a sum of an active period AT and a vertical blank period VB. The vertical blank period VB is allocated with a preset period of time between an active period ACT of a N–1$^{th}$ frame period and an active period ACT of a N$^{th}$ frame period. The timing controller 130 receives a data enable signal DE and data of an input image during an active period ACT. In the vertical blank period VB, there is no data enable signal DE and no data of an input image. During the active period ACT, data of one frame to be written into all pixels 101 is received by the timing controller 130.

The horizontal synchronization signal Hsync defines a horizontal time. The data enable signal DE is synchronized with pixel data, to be displayed on a pixel array of the flexible display panel 100, to define a valid pixel data period. 1 pulse cycle of the data enable signal DE is 1 horizontal time, and a high logic period of the data enable signal DE indicates a pixel data input period of 1 pixel line. A horizontal time 1H refers to a period of time required to write data into pixels of one pixel line in the flexible display panel. A pixel line is aligned along a gate line direction, and includes pixels connected to the same gate lines. Pixels of one pixel line share a gate line, to which a gate signal (or a scan signal) is applied, and thus, the pixels are simultaneously addressed in accordance with the scan signal and supplied with a data voltage of pixel data.

As found in the data enable signal DE, input data is not received by the display device during the vertical blank period VB. The vertical blank period VB includes a vertical sync time VS, a vertical front porch FP, and a vertical back porch BP.

Pixels of the organic light emitting display includes an OLED, and a driving device which drives an OLED by applying a current to the OLED according a gate-source voltage. The driving device may be implemented as a TFT in a Metal Oxide Semiconductor Field Effect Transistor (MOSFET) structure. There may be non-uniform OLEDs and driving devices between pixels and subpixels. The OLEDs and driving devices need to have uniform electrical characteristics in the entire screen. However, due to a processing deviation and a deviation of device characteristics, there is inevitably a difference between pixels and the deviations may change over a display driving time.

In order to compensate for an electrical characteristic deviation of an OLED and a driving device, an internal compensation circuit and an external compensation circuit may be applied to an organic light emitting display. The internal compensation circuit samples a gate-source voltage Vgs of a driving device, which changes depending on electrical characteristics of the driving device, and compensates for a data voltage as much as the gate-source voltage. The external compensation circuit senses an electrical characteristic of a pixel, which changes depending on electrical characteristics of the OLED and the driving device, and modulates pixel data of an input image with a compensation value determined by the sensing value, thereby compensating for deterioration caused by an electrical characteristic deviation between the pixels and sequential change in the pixels.

Figure 6:
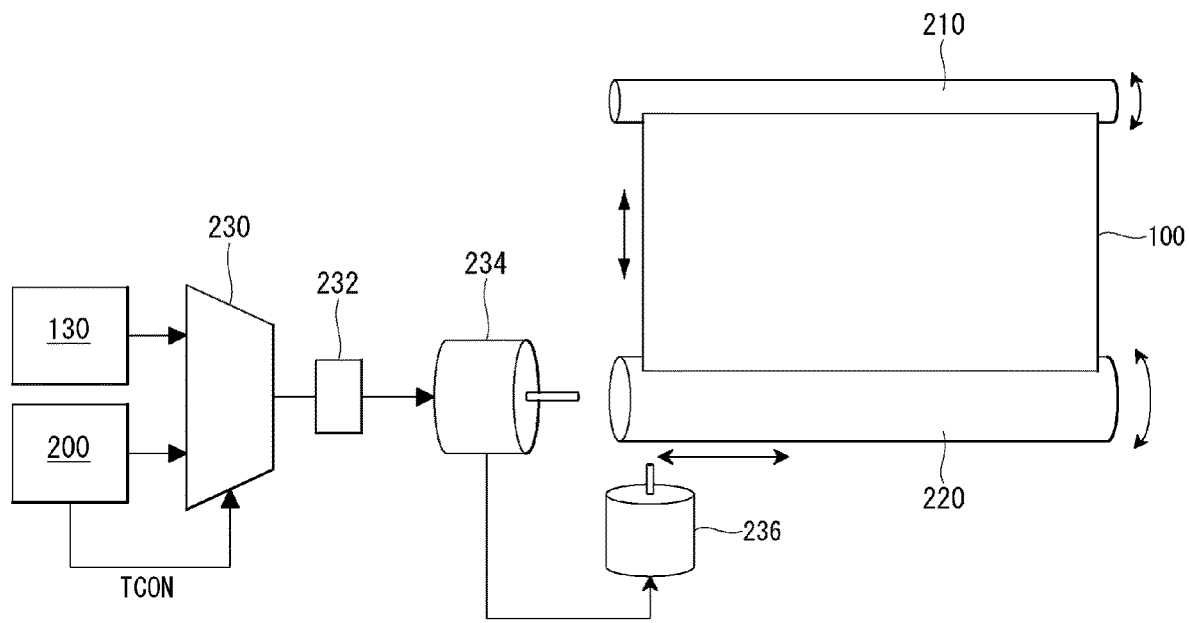
FIG. 6 is a diagram illustrating a timing controller for controlling a motor, and a host system.

FIG. 6 is a diagram illustrating a timing controller for controlling motors 234 and 236, and a host.

Referring to FIG. 6, the motors 234 and 236 may be connected to the flexible display panel 100 via a gear box.

The rollable display of the present disclosure needs to move the flexible display panel 100 by driving the motors 234 and 236 while moving an exposed display region in a moving direction of the flexible display panel 100 at the same time. The timing controller 130 has the control right of the motors 234 and 236 during a normal driving period in which an input image is displayed.

The host system 200 has the control right of the motors 234 and 236 during a period in which an image is not received by the timing controller 130. Upon receiving an image signal from a video source, the host system 200 controls a control right selector 230 so as to connect the timing controller to a motor driver 232 so that the timing controller 130 has the control right of the motors 234 and 236. As illustrated in FIG. 8, while there is no image signal, the host system 200 is connected with the motor driver 232 to have the control right of the motor 234 and 236.

A shaft of a first motor 234 is connected to a driving roller 221. The first motor 234 is driven by the motor driver 232 to move the flexible display panel 100 in an upward-downward direction (Y axis). As being rotated by the first motor 234, the driving roller 221 spreads the flexible display panel 100 to expand the screen, or rolls up the flexible display panel 100 to reduce the screen.

Figure 7:
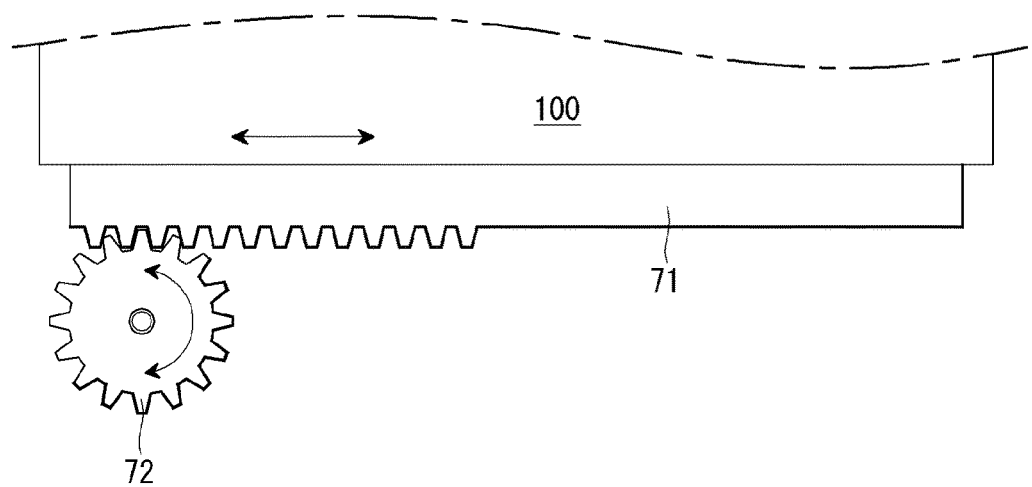
FIG. 7 is a diagram illustrating a device connecting a second motor and a display panel.

A second motor 236 is connected with the flexible display panel 100 via the gear box. As illustrated in FIG. 7, the gear box may include a pinion 72 connected to a shaft of the second motor 236, and a rack 71 connected to the flexible display panel 100. A gear train of the pinion 72 is engaged with a gear train of the rack 71. Thus, when the second motor 236 is driven, the display panel 100 is moved in a leftward-rightward direction (X axis). Meanwhile, any one of the first and second motors 234 and 236 may be omitted.

FIG. 8 is a diagram illustrating the control right of a motor according to an event of a rollable display. In FIG. 8, "SET" indicates the host system 200, and "TCON" indicates the timing controller 130.

Referring to FIG. 8, the host system 200 has the control right of the motors 234 and 236 with a priority higher than that of the timing controller 130 in response to most of all events, including Power On/Off, Motor User Control, Partial Mode Selection, SET Request, TCON Booting, etc.

The timing controller 130 temporarily takes over the control right from the host system 200 at the start time of a normal driving period in which an image is displayed on the screen. A method of moving the exposed display region 102 is an operation related to a lifespan, and thus, it is not an essential operation and it is not necessary to hand over the control right to the timing controller 130 immediately after the normal driving period. Thus, in response to occurrence of an event in which the motors 234 and 236 operate in the host system 200, the timing controller 130 needs to stop moving the position of the exposed display region 102 and hand over the control right of the motors 234 and 236 to the host system.

Figure 9:
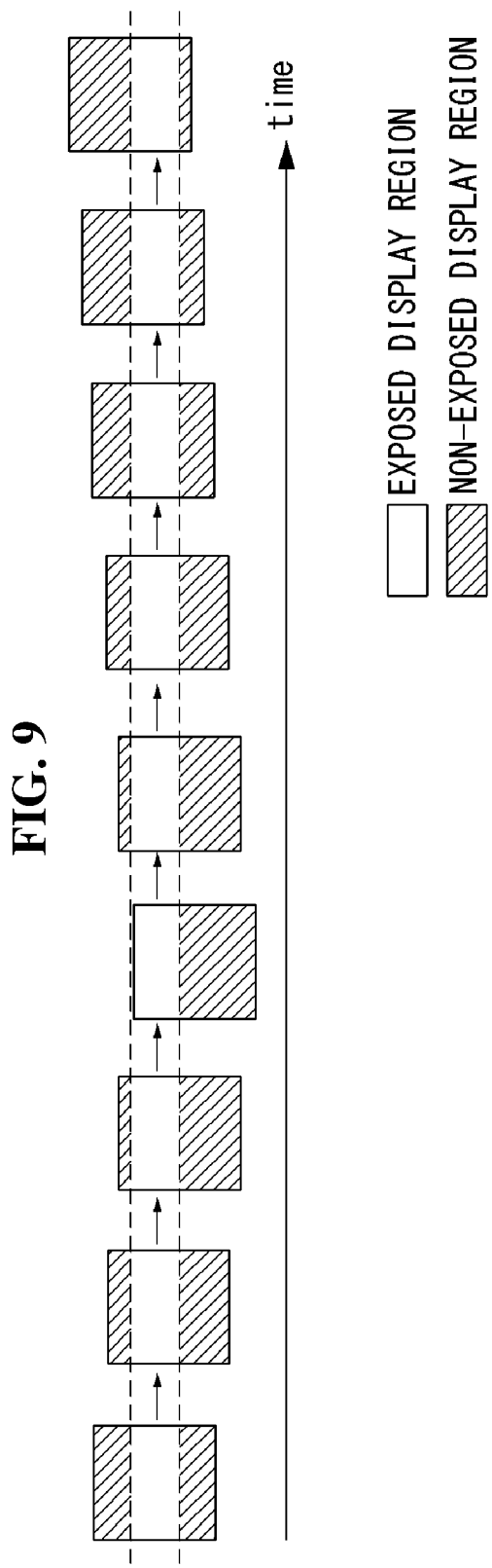
FIG. 9 is a diagram illustrating an example in which an absolute location of an exposed display region is not changed when a screen of a flexible display panel moves upward and downward.

FIG. 9 is a diagram illustrating an example in which an absolute location of an exposed display region does not change when a screen of a flexible display moves upward and downward. As illustrated in FIG. 9, the host system 200 may drive the first motor 234 at a predetermined time interval on the time axis to thereby move the flexible display panel 100 downward and then move the flexible display panel 100 upward. The timing controller 130 moves the exposed display region 102 in a direction opposite to a moving direction of the screen of the flexible display panel 100.

The timing controller 130 may drive the motor 234 to thereby move the exposed display region 102 in a direction opposite to a moving direction of the screen at the same time when the screen of the flexible panel 100 is moved. In addition, immediately after when the motor 234 stops operating, the timing controller 130 may move the exposed display region 102. When resolution of the flexible display panel 100 is UHD, a horizontal time 1H is approximately 3.7 µs. Thus, in the case where a vertical movement length of one pixel line is assumed to be 1 mm, the screen can move in the same direction as a scan moving direction of the exposed display region 102 only when the screen of the flexible display panel 100 is moved for a time of 3.7 µs*2160. Meanwhile, after the motor is driven in a vertical blank period VB to thereby move the screen of the flexible display panel 100, it is possible to scan the exposed display region 102 in an active period ACT of the next frame driving time.

When a fixed pattern of an input image is displayed in the exposed display region 102, locations of pixels into which pixel data is written changes and thus the stress of the pixels is distributed. As a result, the present disclosure may prevent an afterimage even though a fixed pattern is displayed on a screen for a long time.

Since the exposed display region 102 is moved in a direction opposite to a physical movement direction of the screen, the position of the exposed display region 102 from a user's point of view and the size of the exposed display region 102 are fixed, as illustrated in FIG. 9. In other words, a relative location of the exposed display region 102 changes on the screen, but an absolute location of the exposed display region 102 from the user's point of view is fixed. Thus, the user may not be able to recognize the change in the location of the exposed display region 102.

Figure 10:
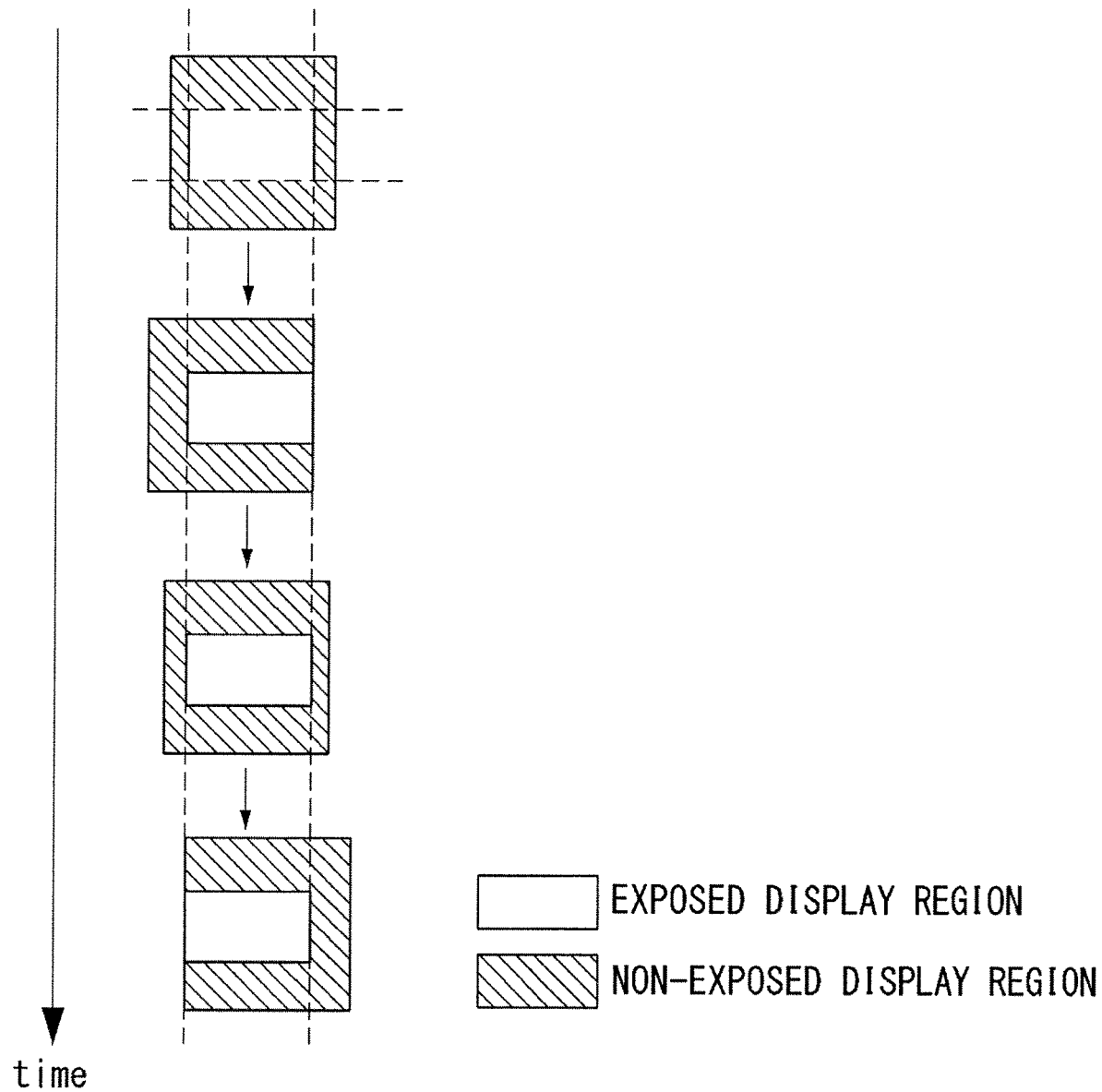
FIG. 10 is a diagram illustrating an example in which an absolute location of an exposed display region is not changed when a screen of a flexible display panel moves leftward and rightward.

FIG. 10 is a diagram illustrating an example in which an absolute location of an exposed display region does not change when the screen of the flexible display panel 100 is moved leftwards and rightwards. As illustrated in FIG. 10, the host system 200 drives the second motor 236 at a predetermined time interval on the time axis to thereby move the flexible display panel 100 leftward and rightward. The timing controller 130 moves the exposed display region 102 in a direction opposite to a moving direction of the screen of the flexible display panel 100. When the motors 234 and 236 stop operating, the timing controller 130 takes over the control right of the motors 234 and 236 and moves the exposed display region 102.

When a fixed pattern of an input image is displayed in the exposed display region 102, locations of pixels into which pixel data of the fixed pattern is written changes and thus the stress of the pixels is distributed. As a result, the present disclosure may prevent an afterimage even though the fixed pattern is displayed on the screen for a long time.

Since the exposed display region 102 is moved in a direction opposite to a physical movement direction of the screen, the location of the exposed display region 102 from a user's point of view and the size of the exposed display region 102 are fixed, as illustrated in FIG. 9. In other words, a relative location of the exposed display region 102 changes on the screen, but an absolute location of the exposed display region 102 from the user's point of view is fixed. Thus, the user may not be able to recognize the change in the location of the exposed display region 102.

FIGS. 11A to 13B are diagrams illustrating a driving method of an exposed display region and a non-exposed display region, which is changed according to rolling of a screen. In this example, the flexible display panel 100 is moved upward by 25% when 50% of the flexible display panel 100 is exposed.

Referring to FIGS. 11A to 13B, a location of a first pixel line may be fixed to a scan start location, regardless of movement of the screen of the flexible display panel 100. This method may simplify a system of the rollable display. If all lines on the screen are scanned from the fixed scan start location and pixel data is written into only pixels of the exposed display region 102, it is possible to simplify a scan method without a need for considering resolution difference.

The gate driver 120 starts to supply a first gate signal to a scan start location, that is, a gate line of a first pixel line, and then sequentially supplies gate signals to all gate lines 104 in the screen. Through the data lines 103, the data driver 110 supplies a black voltage of the lowest gray scale (or a black scale), which is preset regardless of the input image, to the non-exposed display region 104. Through the data lines 103, the data driver 110 supplies a pixel data voltage of the input image to pixels of the exposed display region 102. This method may simplify a scan method since the timing controller 130 is able to apply the same scan method without a need for independently applying scan methods corresponding diverse resolution according to resolution.

Figure 11A:
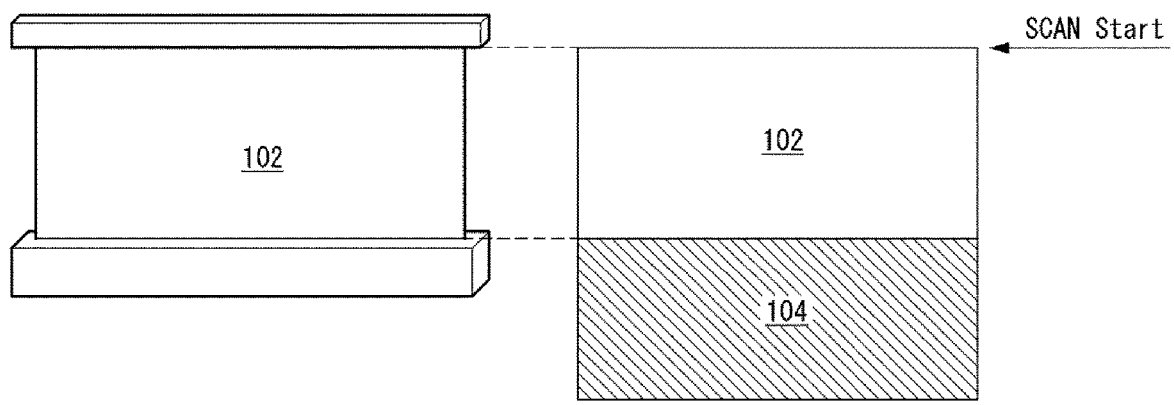
FIGS. 11A to 13B are diagrams illustrating a driving method of an exposed display region and a non-exposed display region which are changed in response to rolling of a screen.
Figure 11B:
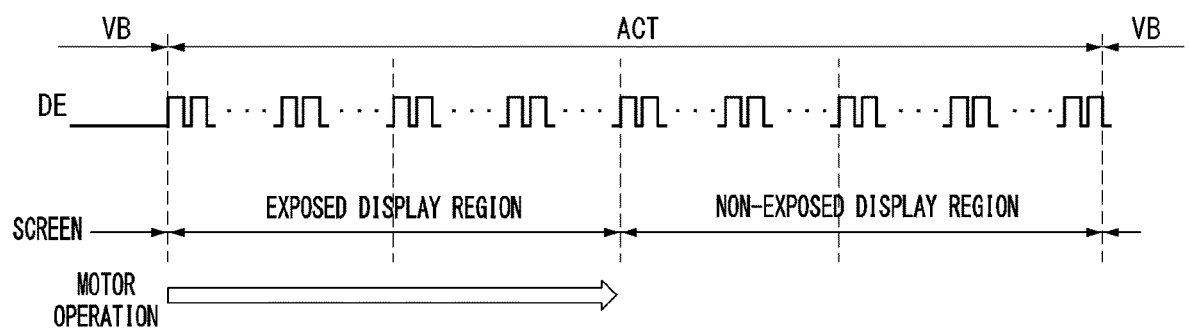

FIG. 11A shows the exposed display region 102 and the non-exposed display region when the lowermost end of the exposed display region 102 reaches 50% position of the vertical length of the flexible display panel 100. In this case, the operating of the motor 234 is 50% and thus exposes the upper part of the screen. Thus, the upper part of the screen, that is, 50% of the area of the screen, is the exposed display region 102. The lower part of the screen is the non-exposed region 104 rolled around a roller inside the second box 220. As illustrated in FIG. 11B, the timing controller 130 counts a pulse of a data enable signal DE so as to transmit pixel data of an input image to the data driver 110 for a 0% to 50% period of the data enable signal DE. As a result, the input image is displayed on the exposed display region 102 that is defined as the upper part of the screen.

Figure 12A:
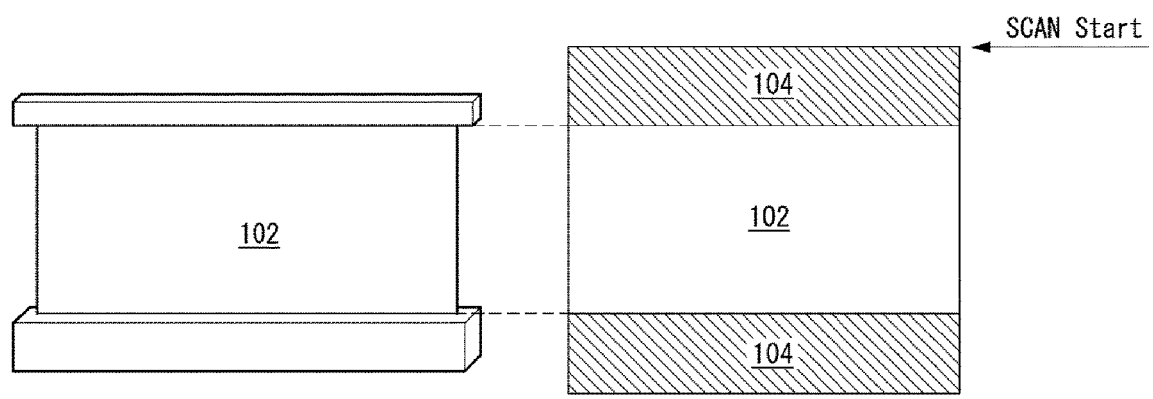

FIG. 12A shows the exposed display region 102 and the non-exposed display region 104 when the flexible display panel 100 is moved upward by 25%. At this time, the lowermost end of the exposed display region 102 reaches 70% position of the vertical length of the flexible display panel 100. The operating of the motor 234 is 75% to thereby expose the central portion of the screen. Thus, the exposed display region 102 is moved to an area of 50% of the screen area around the central portion of the screen. In this case, an absolute location of the exposed display region 102 from a user's point of view does not change. 25% of the upper part of the screen is the non-exposed region 104 which is rolled over the rear surface by the roller 211 inside the first box 210, and 25% of the lower part of the screen is the non-exposed region 104 which is rolled around a roller inside the second box 220.

Figure 12B:
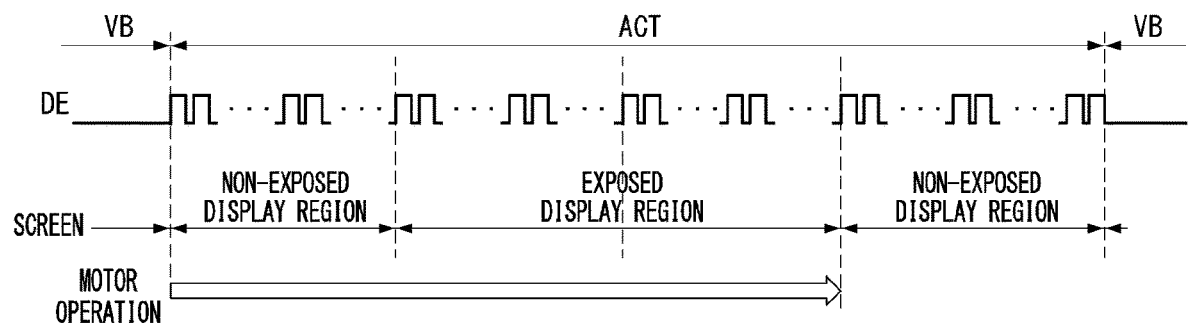

As illustrated in FIG. 12B, the timing controller 130 counts a pulse of a data enable signal DE to thereby transmit pixel data of an input image to the data driver 110 in a 25% to 75% period of the data enable signal DE. As a result, the input image is displayed on the exposed display region 102 which is defined as the central portion of the screen.

Figure 13A:
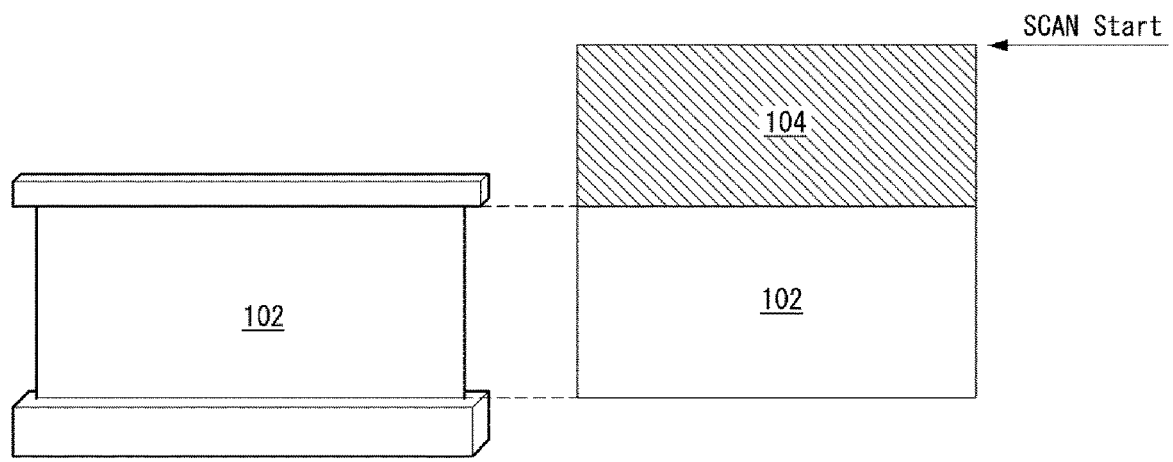

FIG. 13A shows the exposed display region 102 and the non-exposed display region 104 when the flexible display panel 100 is moved upward by 25%. At this time, the lowermost end of the exposed display region 102 reaches 100% position of the vertical length of the flexible display panel 100. The operating of the motor 234 is 100% to thereby expose the lower part of the screen. Thus, the screen of the exposed display region 102 moves to the lower part of the screen. In this case, the absolute location of the exposed display region 102 from a user's point of view does not change. The upper part of the screen is the non-exposed region 104 which is rolled over the rear surface by the roller 211 in the first box 210.

Figure 13B:
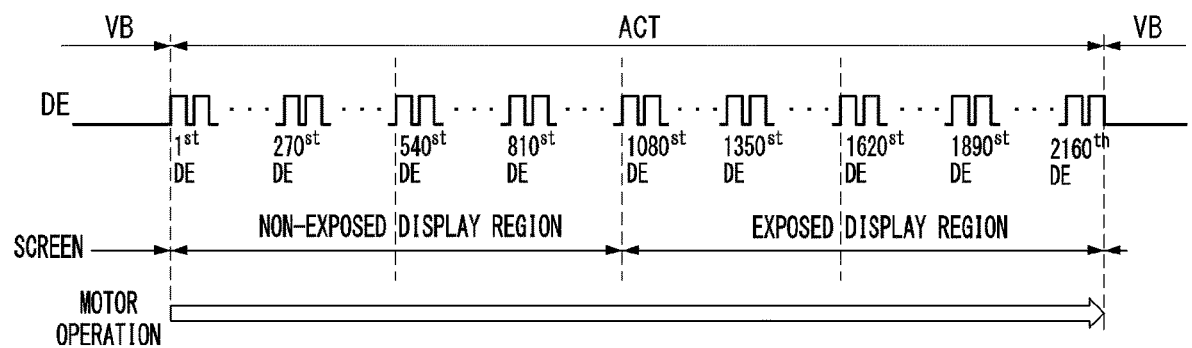

As illustrated in FIG. 13B, the timing controller 130 counts a pulse of a data enable signal DE to thereby transmit pixel data of an input image to the data driver 110 in a 50% to 100% period of the data enable signal. As a result, the input image is displayed on the exposed display region 102 which is defined as the lower part of the screen.

As illustrated in FIGS. 11A to 13B, a scan start location, at which scanning starts on the flexible display panel 100, is fixed regardless of movement of the screen of the flexible display panel 100. On the contrary, as the screen moves, a data writing start location, at which a data signal starts to be written in the exposed display region 100, changes. When the screen continuously moves in the same direction, a distance between the scan start location and the data writing start location increases.

As illustrated in FIGS. 14A to 14D, at least one of a screen size of the flexible display panel 100, a ratio between an exposed display region and a non-exposed display region in the screen of the flexible display panel 100, or an aspect ratio of the exposed display region 102 may be automatically changed according to an input user command.

Figure 14D:
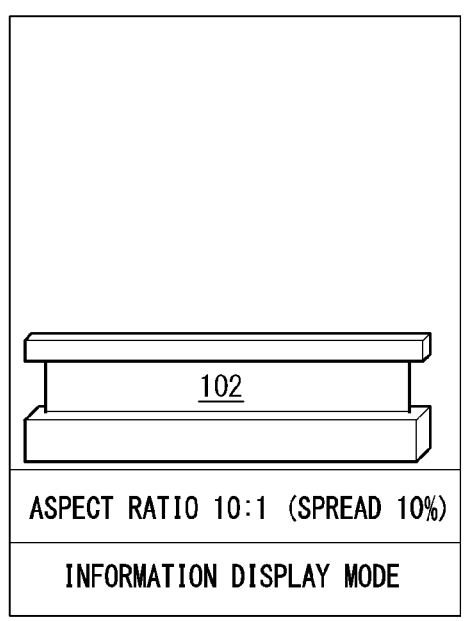

The rollable display of the present disclosure provides a partial mode as shown in FIGS. 14A to 14D. The host system 200 may switch to the partial mode according to content of an input image or a user command. In FIG. 14A, the screen is in a 100% exposed frame mode. The host system 200 may switch to the partial mode according to content of an input image and a user command. For example, in response to reception of a TV signal or a user's adjustment of an aspect ratio, the host system 200 may drive the motor 234 to thereby adjust an aspect ratio (x:y) of the exposed display region 102 to 16:9 in a TV mode, as shown in FIG. 14B. An aspect ratio indicates a relationship between a width and a height of the screen. If content of an input image is a movie or if a user adjusts the aspect ratio, the host system 200 may drive the motor 234 to automatically adjust the aspect ratio (x:y) of the exposed display region 102 to 21:9 in a movie mode, as shown in FIG. 14C. In addition, if an input signal includes only information without an image signal or if a user adjusts the aspect ratio, the host system 200 may drive the motor 234 to automatically adjust the aspect ratio (x:y) of the exposed display region 102 to 10:1 in an information mode, as shown in FIG. 14D.

A partial mode is a mode which takes the advantage that the rollable display does not show a fixed screen. The partial mode may be set as a mode desired by a user, and used to increase a sense of immersion of a display or enhance the design. If the aspect ratio is fixed in the partial mode for a long time, stress is accumulated in only pixels of the exposed display region 102 being driven in the partial mode. In this case, due to degradation of pixels of the exposed display region 102 in the partial mode, the lifespan of the pixels are reduced even in an image other than a fixed pattern, and thus, brightness of a displayed image is reduced. Because there is a significant difference in driving time between the exposed display region 102 and the non-exposed display region 104 in the partial mode, the image quality may be deteriorated when the partial mode is switched to another mode. For example, if a user displays a move in the exposed display region 102 having an aperture of 21:9 in a movie mode, OLEDs are relatively deteriorated a lot in the pixels of the exposed display region 102. If the user switches to a TV mode and vertically expands the exposed display region 102 to an aperture ratio of 16:9, the user may recognize a block Dim between a movie chroma block and an additional screen block.

The present disclosure prevents acceleration of degradation of pixels in a particular screen area because the exposed display region 102 moves even though a particular aspect ratio is fixed for a long time. Thus, it is possible extend the lifespan of the pixels and prevent degradation of brightness. The exposed display region 102 relatively move in the entire screen of the flexible display panel but it is fixed at an absolute location from a user's perspective view, and therefore, the user is not able to recognize movement of the exposed display region 102.

Figure 15A:
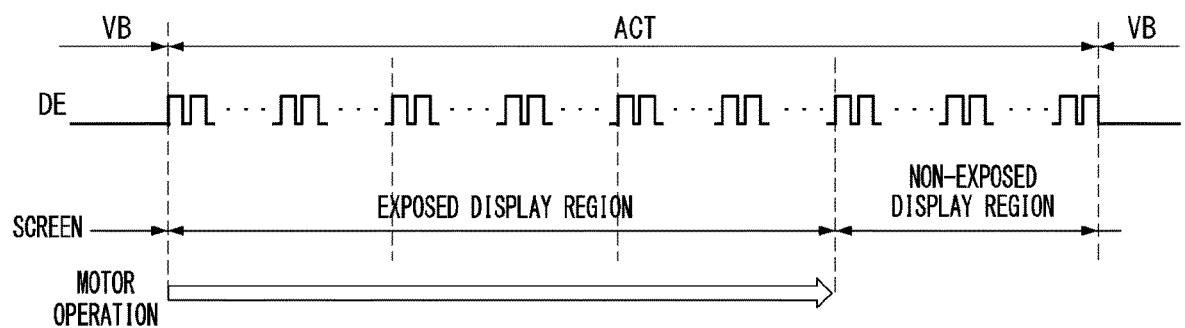
FIGS. 15A and 15B are diagrams illustrating movement of an exposed display region in a TV mode, as in FIG. 14B.
Figure 15B:
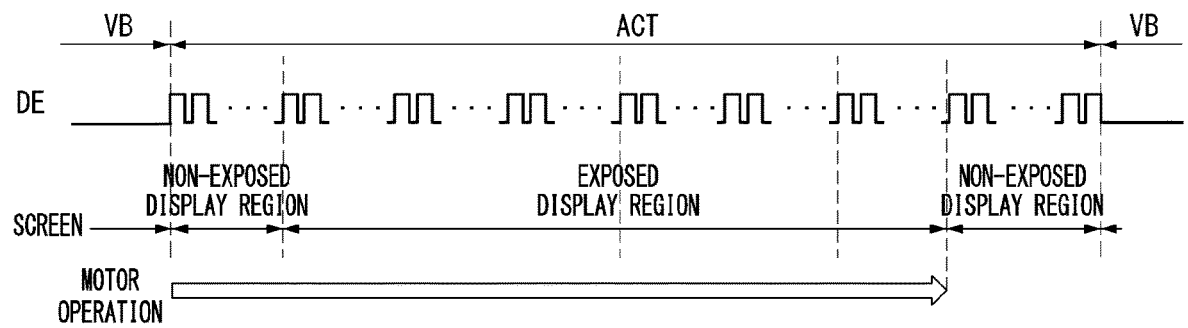

FIGS. 15A and 15B are diagrams illustrating movement of an exposed display region in a TV mode, as shown in FIG. 14B. In FIG. 15A, the motor 234 is driven at an operating rate of 59.25% to expose the exposed display region 102 to the aspect ratio 16:9 of the screen. In FIG. 15B, the motor 234 is driven at an operating rate 63.28% to move the exposed display region 102 downward in the screen. The timing controller 130 transmits pixel data of an input image to the data driver 110 in a data enable signal period corresponding to the exposed display region 102, and moves the data enable signal period in response to movement of the exposed display region 102.

Figure 16A:
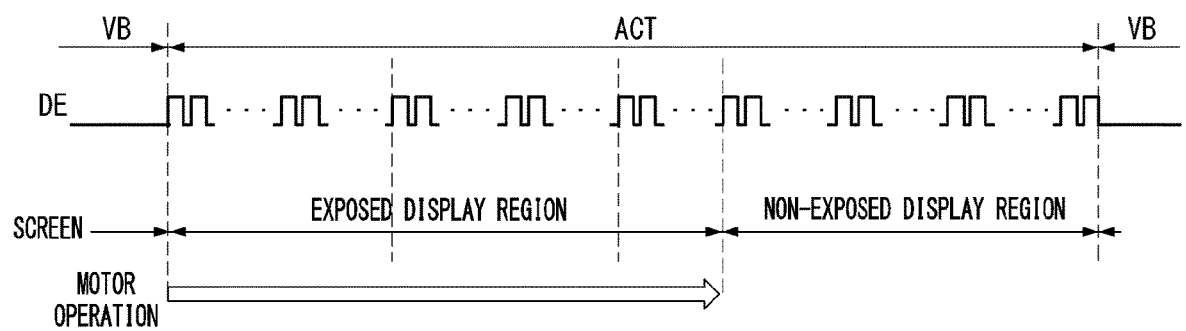
FIGS. 16A and 16B are diagrams illustrating movement of an exposed display region in a movie mode, as in FIG. 14C.
Figure 16B:
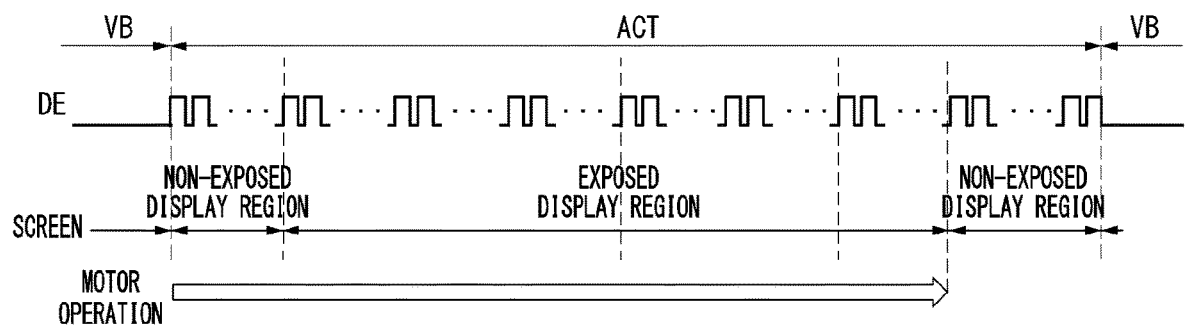

FIGS. 16A and 16B are diagrams illustrating movement of an exposed display region in a movie mode, as shown in FIG. 14C.

In FIG. 16A, the motor 234 is driven at an operating rate of 42.86% to exposed the exposed display region 102 to the aspect ratio 21:9 of the movie mode. In FIG. 16B, the motor 234 is driven at an operating rate of 49.9%, to move the exposed display region 102 downward in the screen. The timing controller 130 transmits pixel data of an input image to the data driver 110 in a data enable signal period corresponding to the exposed display region 102, and moves the data enable signal period in response to movement of the exposed display region 102.

If the aspect ratio is such that the non-exposed region is large as in the movie mode or the information mode, an area in which the exposed display region 102 is large as well. Thus, the present disclosure continuously moves the screen using a motor, and moves the exposed display region by a moved distance of the screen in a direction opposite to the moving direction of the screen, thereby enabled to solve the problem that the lifespan of the display is shortened and brightness thereof is reduced. Meanwhile, if the aspect ratio of the frame mode is set to 10:9 rather than 1:1, the exposed display region 102 is able to move using the non-exposed display region and thus it is possible to solve a short lifespan and low brightness even in a liquid mode.

As described above, the present disclosure moves the screen of the flexible display panel and moves the exposed display region in a direction opposite to a moving direction of the screen to thereby distribute stresses of pixels without changing the absolute location of the exposed display region from a user's point of view and reducing the speed of degradation. As a result, the present disclosure may prevent an afterimage by distributing the stress of the pixels while a user does not recognize a change in the location of the screen.

The present disclosure may solve the shortened lifespan of the pixels and reduced brightness of a display image by moving the exposed display region in the partial mode.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rollable display comprising:
a flexible display panel;
a data driver configured to supply a data signal of an input image to the flexible display panel;
a timing controller configured to transmit data of the input image to the data driver and control an operation timing of the data driver; and
a screen driver configured to move a screen of the flexible display panel,
wherein the screen of the flexible display panel is separated into an exposed display region and a non-exposed display region,
wherein the input image is displayed on the exposed display region,
wherein the exposed display region is moved in a direction opposite to a moving direction of the screen, and
wherein a location and size of the input image displayed on the exposed display region are fixed while the screen is reciprocated in at least one of vertical and horizontal directions on the screen.

2. The rollable display of claim 1, wherein the exposed display region is moved at a predetermined time interval in the vertical direction.

3. The rollable display of claim 1, wherein the exposed display region is moved at a predetermined time interval in the horizontal.

4. The rollable display of claim 1, further comprising:
a first box having a first roller around which an upper end of the flexible display panel is rolled; and
a second box having a second roller around which a lower end of the flexible display panel is rolled,
wherein the second roller is rotated by a motor for the screen driver, and
wherein the non-exposed display region comprises a portion of the screen rolled around the first roller.

5. The rollable display of claim 1, wherein, after the movement of the exposed display region, the timing controller is further configured to:
detect a data enable signal period corresponding to the exposed display region; and
transmit data, which is to be written into pixels of the exposed display region, to the data driver.

6. The rollable display of claim 1, wherein the screen driver comprises:
a first motor configured to move the flexible display panel in the vertical direction; and
a second motor configured to move the flexible display panel in the horizontal direction.

7. The rollable display of claim 1, wherein the timing controller is further configured to:
take over a control right of a motor for the screen driver at a start time of a normal driving period in which the input image is displayed on the exposed display region; and hand over the control right of the motor to a host system when an event requiring the motor to drive occurs in the host system.

8. The rollable display of claim 1, wherein the exposed display region is moved at a predetermined time interval while being driven with a predetermined aspect ratio of a partial mode.

9. The rollable display of claim 1, wherein at least one of a screen size of the flexible display panel, a ratio between the exposed display region and the non-exposed display region in the screen of the flexible display panel, or an aspect ratio of the exposed display region is changed.

10. A rollable display comprising:
a flexible display panel;
a data driver configured to supply a data signal of an input image to data lines of the flexible display panel;
a gate driver configured to sequentially supply gate signals to gate lines of the flexible display panel to sequentially scan a screen of the flexible display panel one line by one line;
a timing controller configured to transmit data of the input image to the data driver and control operation timings of the data driver and the gate driver; and
a screen driver configured to move the screen of the flexible display panel,
wherein the screen of the flexible display panel is separated into an exposed display region and a non-exposed display region,
wherein the input image is displayed on the exposed display region,
wherein the exposed display region is moved in a direction opposite to a moving direction of the screen, and
wherein a location and size of the input image displayed on the exposed display region are fixed while the screen is reciprocated in at least one of vertical and horizontal directions on the screen.

11. The rollable display of claim 10, wherein a scan start location, at which scanning starts in the flexible display panel, is fixed regardless of movement of the screen of the flexible display panel.

12. The rollable display of claim 11, wherein a data writing start location, at which the data signal starts to be written in the exposed display region, is changed according to the movement of the screen.

13. The rollable display of claim 12, wherein a distance between the scan start location and the data writing start location increases when the screen continues to move in any one of an upward direction, a downward direction, a leftward direction and a rightward direction.

14. The rollable display of claim 10, wherein at least one of a screen size of the flexible display panel, a ratio between the exposed display region and the non-exposed display region in the screen of the flexible display panel, or an aspect ratio of the exposed display region, is changed.

15. The rollable display of claim 10, further comprising:
a first box having a first roller around which an upper end of the flexible display panel is rolled; and
a second box having a second roller around which a lower end of the flexible display panel is rolled,
wherein the second roller is rotated by a motor for the screen driver, and
wherein the non-exposed display region comprises a portion of the screen rolled around the first roller.

16. The rollable display of claim 10, wherein the screen driver comprises:
a first motor configured to move the flexible display panel in an upward and downward direction; and a second motor configured to move the flexible display panel in a leftward and rightward direction.

17. A driving method of a rollable display having a flexible display panel capable of being rolled by a driving force of a screen driver, the method comprising:
- separating a screen of the flexible display panel into an exposed display region and a non-exposed display region;
- displaying an input image on the exposed display region;
- moving the screen of the flexible display panel using the screen driver; and
- controlling a moving direction of the exposed display region to be opposite to a moving direction of the screen,
- wherein a location and size of the input image displayed on the exposed display region are fixed while the screen is reciprocated in at least one of vertical and horizontal directions on the screen.

18. The driving method of claim 17, wherein the exposed display region is moved at a predetermined time interval in at least one of the vertical and horizontal directions.

19. The driving method of claim 17, further comprising:
- a first box having a first roller around which an upper end of the flexible display panel is rolled; and
- a second box having a second roller around which a lower end of the flexible display panel is roiled,
- wherein the second roller is rotated by a motor for the screen driver, and
- wherein the non-exposed display region comprises a portion of the screen rolled around the first roller.

20. The driving method of claim 17, wherein the screen driver comprises:
- a first motor configured to move the flexible display panel in the vertical direction; and
- a second motor configured to move the flexible display panel in the horizontal direction.

* * * * *